United States Patent Office 2,739,159
Patented Mar. 20, 1956

2,739,159

PROCESS FOR THE PREPARATION OF TETRAHYDROFURFURYLAMINE

John B. Tindall, Terre Haute, Ind., assignor to Commercial Solvents Corporation, Terre Haute, Ind., a corporation of Maryland No Drawing. Application August 15, 1951, Serial No. 242,035

7 Claims. (Cl. 260—347.7)

The present invention relates to a novel process for the preparation of tetrahydrofurfurylamine. More particularly, it is concerned with a method for preparing tetrahydrofurfurylamine by catalytic hydrogenation of furfurylamine in aqueous solutions, as more particularly described hereinafter.

It is known that tetrahydrofurfurylamine may be prepared by catalytic liquid phase hydrogenation of furfurylamine or the reaction product of furfural and ammonia. Such prior art processes involved hydrogenation without the use of a solvent, or the use of alcoholic solvents. In practicing these prior processes, it is always necessary that temperatures in excess of 110° C. be employed over a great length of time to effect complete hydrogenation of the furan ring. When operating under such high temperatures using furfural and ammonia there are simultaneously produced substantial quantities of a nitrogen-containing polymer, presumably a co-polymer of furfural and furfurylamine, or possibly polymers resulting from open chain unsaturated products formed by hydrogenolysis of the furan ring. Irrespective of the theory as to the structure of said polymeric material, the processes of producing tetrahydrofurfurylamine by hydrogenating without a solvent or in the presence of alcoholic solvents are highly inefficient both from the standpoint of time consumed, and low yields.

I am aware that prior investigators have reported it possible to hydrogenate the furan ring at temperatures below 110° C., or even below 100° C. These reports, however, were concerned with hydrogenation of the unsubstituted furan ring, or the furan ring substituted with constituents other than the aminomethyl radical present in furfurylamine. Furthermore such hydrogenations were carried out with noble metal catalysts. As far as I have been able to determine, it has heretofore been considered impractical to hydrogenate the furan ring in furfurylamine at temperatures below 110° C. in the presence of base metal catalysts.

I have now discovered a process whereby furfurylamine can be hydrogenated at temperatures below 100° C. to tetrahydrofurfurylamine in a shorter period of time and with very high conversions and practically quantitative yields. These improved results are brought about by carrying out the hydrogenation in the presence of water.

In carrying out my invention the furfurylamine is dissolved in water and introduced, together with a catalyst, to a suitable pressure hydrogenation apparatus, and sealed. I have used aqueous solutions of furfurylamine containing from 28 to 80% of furfurylamine with equally good results.

The apparatus used in my invention may be of the Adkins type which comprises a cylindrical steel reaction vessel fitted with flexible tubing for the introduction of hydrogen gas under pressure. The apparatus is preferably kept in motion during the hydrogenation in order to insure thorough mixing of the amine, the hydrogen and the catalyst. The reaction vessel may be wrapped with an electrical heating coil and cooling means may also be provided in order that the hydrogenation may be carried out at the desired temperature. After the hydrogenation is complete, the reaction mixture is removed from the apparatus and the resulting tetrahydrofurfurylamine is separated.

When absorption of hydrogen has ended, as evidenced by no further drop in pressure, the reaction mixture is removed from the vessel and the catalyst removed by filtration. The resulting solution is then distilled at about 99° C. to remove any unreacted furfurylamine as an azeotrope with water. The distillation is then continued at 100 C.° to remove the remaining water from the tetrahydrofurfurylamine.

In practicing my invention any temperature within the range of 50° to 100° C. can be employed. Ordinarily I prefer to operate at a temperature of about 60° C. The higher temperatures, between about 60° C. and 100° C., are necessary to complete hydrogenation of furfurylamine only when the catalyst has been used several times.

For efficient reaction to take place it is essential that good contact between the reactants and the catalyst be maintained. This can be effected by external agitation of the reaction vessel or by internal stirring. In fact, any method whereby the gas, liquid and catalyst are brought into intimate contact will expedite the reaction.

I have found, in general, that any suitable base metal hydrogenation catalyst that is active at the desired operating temperature can be used in my process. A number of such hydrogenation catalysts are described in Hydrogenation of Organic Substances, 3d edition, 1930, by Carleton Ellis. Nickel catalysts are preferred to other base metal catalysts, e. g. copper, cobalt, copper chromite, etc. I prefer to use a finely-divided nickel catalyst, the preparation of which is described in U. S. Patent 1,628,190 by Murray Raney.

The use of moderately high pressure is advantageous because it increases the rate of hydrogenation. It is preferred to operate at pressures between 500 to 2000 pounds per square inch, but slightly lower pressures can be used. The upper pressure is limited only by the strength of the reaction vessel.

A better understanding of the nature of my invention can be had by reference to the following examples, which are given by way of illustration only and are in no way intended to limit the scope of my invention.

Example I

A mixture of 200 grams of furfurylamine in 500 ml. of water was introduced, together with 15 grams of nickel catalyst, into an Adkins type hydrogenation apparatus. Hydrogen was introduced and maintained at a pressure of 1000 pounds per square inch and the temperature was maintained at 60° C. After four and one-half hours under these conditions hydrogen absorption ceased and agitation of the vessel was then stopped. The reaction mixture was filtered to remove the catalyst and the water and unreacted furfurylamine were removed from the tetrahydrofurfurylamine by distillation of the filtrate. There were recovered 6 grams of furfurylamine and 202 grams of tetrahydrofurfurylamine, for a conversion of 97% and a 100% yield.

The above experiment was repeated, except that 500 grams of methanol was substituted for the water. Nine hours were required for hydrogenation of the furfurylamine in this experiment and 93% of the furfurylamine was converted to tetrahydrofurfurylamine. Four and one-half grams of furfurylamine were recovered. Of the hydrogen absorbed in this experiment, 11% was absorbed in the first two hours at 60° C. It was then necessary to raise the temperature to slightly above 100° C., and the remaining hydrogen was absorbed in 7 hours at this temperature.

The experiment was again repeated with no solvent being used for the furfurylamine. In this experiment 30 hours were required to obtain a conversion of 91%. Of the hydrogen absorbed, 11% was absorbed in 4 hours at 60–77° C., 16% in one hour at 96°, 28% in 10 hours at 100° C., 29% in 10 hours at 115° C., and the remainder in 5 hours at 150° C.

*Example II*

This experiment was conducted in accordance with the procedure given in Example I, with a charge consisting of 300 grams of furfurylamine in 400 grams of water. After hydrogen absorption had stopped, the catalyst was separated from the reaction mixture by filtration and used again for hydrogenation of a new charge of 300 grams of furfurylamine in 400 grams of water. After this procedure had been repeated 8 times conversion to tetrahydrofurfurylamine decreased, and for two additional runs the temperature was raised to 90–100° C. At the higher temperatures with the old catalyst, conversions again rose to above 90%.

*Example III*

An experiment was conducted in accordance with the procedure given in Example I, with a charge consisting of 400 grams of furfurylamine in 100 grams of water. After hydrogen absorption ceased, agitation of the vessel was stopped and the reaction mixture filtered to remove the catalyst. The water and unreacted furfurylamine in the reaction mixture were removed with 28 grams of furfurylamine and 352 grams of tetrahydrofurfurylamine being recovered for a conversion of 88% and a yield of 95%.

The above examples are merely descriptions of procedure that are included within the scope of my invention and do not limit it in any manner. For example, my invention is not to be limited to the type of apparatus in which the hydrogenation may be carried out. In addition, optimum conditions such as temperature, hydrogen pressure, and catalyst may be determined experimentally for any particular concentration of furfurylamine in water, and any such variations are included within the scope of my invention.

I claim:

1. A process for preparing tetrahydrofurfurylamine which comprises heating a mixture comprising essentially hydrogen, furfurylamine, and water, at a temperature between 50 and 100° C. and a pressure of at least 500 pounds per square inch, in the presence of a base metal hydrogenation catalyst.

2. A process for preparing tetrahydrofurfurylamine which comprises heating a mixture comprising essentially hydrogen, furfurylamine, and water, at a temperature between 50 and 100° C. and at a pressure between 500 and 20000 pounds per square inch, in the presence of a nickel hydrogenation catalyst.

3. A process for preparing tetrahydrofurfurylamine which comprises subjecting an aqueous furfurylamine solution containing from 28 to 80% furfurylamine, to from 500 to 2000 pounds per square inch of hydrogen pressure, at a temperature between 50 and 100° C., in the presence of a base metal hydrogenation catalyst.

4. A process for the preparation of tetrahydrofurfurylamine which comprises hydrogenating an aqueous solution of furfurylamine in the presence of a nickel hydrogenation catalyst at superatmospheric pressures and a temperature between 50 and 100° C.

5. A process for the preparation of tetrahydrofurfurylamine which comprises hydrogenating an aqueous solution of furfurylamine in the presence of a nickel hydrogenation catalyst at superatmospheric pressure and a temperature of about 60° C.

6. A process for the preparation of tetrahydrofurfurylamine which comprises charging a hydrogenation vessel with an aqueous solution of furfurylamine and a nickel hydrogenation catalyst, introducing hydrogen at a pressure of from about 500 to 2000 pounds per square inch, and maintaining the temperature between 50 and 100° C. while continuing the introduction of hydrogen until absorption thereof ceases.

7. A process for the preparation of tetrahydrofurfurylamine which comprises hydrogenating an aqueous solution of furfurylamine in the presence of a nickel hydrogenation catalyst at superatmospheric pressure and at a temperature between about 50 and 100° C., separating the reaction mixture from the catalyst by filtration, distilling the resulting filtrate to remove unreacted furfurylamine as an azeotrope with water, and continuing the distillation to remove the remaining water.

References Cited in the file of this patent

UNITED STATES PATENTS

| | | |
|---|---|---|
| 1,903,850 | Peters | Apr. 18, 1933 |
| 1,906,873 | Peters | May 2, 1933 |
| 2,047,926 | Cramer | July 14, 1936 |
| 2,109,159 | Winans | Feb. 22, 1938 |
| 2,112,715 | Sly | Mar. 29, 1938 |

OTHER REFERENCES

Sorm: Coll. Czech. Chem. Communs., vol. 12, p. 451 (1947).

Adkins: Reactions of Hydrogen, page 62 (1937). U. of Wisconsin Press, Madison, Wisconsin.

Hurd et al.: JACS 68, page 1200 (1946).

Keimatsu et al.: J. Pharm. Soc. of Japan 544, 506–16 (1927), abstracted in Chem. Abst., 21, 3362 (1927).